United States Patent

Delaite et al.

[11] Patent Number: 6,040,348
[45] Date of Patent: Mar. 21, 2000

[54] COMPOSITION BASED ON PROPYLENE POLYMERS FOR EXPANDED GRANULES, PROCESS FOR OBTAINING IT AND ITS USE

[75] Inventors: Emmanuel Delaite, Braine-le-Comte; Jean Charlier, Ceroux-Mousty; Giuliano Bertozzi, Brussels, all of Belgium

[73] Assignee: Solvay Poloyolefins Europe-Belgium (Societe Anonyme), Brussels, Belgium

[21] Appl. No.: 09/121,103

[22] Filed: Jul. 23, 1998

[30] Foreign Application Priority Data

Jul. 24, 1997 [BE] Belgium .............................. 09700642

[51] Int. Cl.⁷ ....................................................... C08J 9/00
[52] U.S. Cl. ............................. 521/59; 521/134; 525/240
[58] Field of Search ........................ 521/59, 134; 525/240

[56] References Cited

U.S. PATENT DOCUMENTS

| 4,626,555 | 12/1986 | Endo et al. . | |
| 4,720,509 | 1/1988 | Nakamura | 521/59 |
| 4,746,706 | 5/1988 | Nakagawa | 521/59 |
| 4,761,431 | 8/1988 | Nakamura | 521/59 |
| 4,778,829 | 10/1988 | Ichimura et al. | 521/59 |
| 5,091,435 | 2/1992 | Suzuki et al. | 521/59 |
| 5,208,265 | 5/1993 | Grave et al. . | |
| 5,387,620 | 2/1995 | Park | 521/59 |

FOREIGN PATENT DOCUMENTS

| 0071981A1 | 2/1983 | European Pat. Off. . |
| 0147690A2 | 7/1985 | European Pat. Off. . |
| 0317995A2 | 5/1989 | European Pat. Off. . |
| 0359517A2 | 3/1990 | European Pat. Off. . |
| 0530486A1 | 3/1993 | European Pat. Off. . |
| 4420590A1 | 12/1995 | Germany . |

*Primary Examiner*—Morton Foelak
*Attorney, Agent, or Firm*—Venable

[57] ABSTRACT

Composition for expanded granules, which comprises, per 100 parts by weight, from 60 to 90 parts by weight of a propylene homopolymer (A) having a melt flow index (MFI) from 0.1 to 20 g/10 min and from 40 to 10 parts by weight of a propylene random copolymer (B) containing from 3 to 20 mol % of ethylene and/or of an $\alpha$-olefin having from 4 to 6 carbon atoms, the MFI of which ranges from 25 to 3000 g/10 min.

Process for obtaining this composition and use of this composition for the manufacture of expanded granules and cellular articles obtained by molding these granules.

14 Claims, No Drawings

COMPOSITION BASED ON PROPYLENE POLYMERS FOR EXPANDED GRANULES, PROCESS FOR OBTAINING IT AND ITS USE

The present invention relates to a composition based on propylene polymers, which can be converted into expanded granules. It also relates to a process for obtaining such a composition as well as to its use for the manufacture of expanded granules. Finally, it relates to cellular articles fashioned from the said granules.

It is known to use propylene polymers for manufacturing cellular articles from pre-expanded particles. Polypropylene is in fact preferred to polystyrene when it is desired for the cellular articles to have chemical resistance, heat resistance and/or a superior impact-strength/rigidity compromise.

Thus, document EP-A-0,071,981 mentions completely generally the use of blends of propylene homopolymers and of ethylene/propylene copolymers for the manufacture of cellular articles which are able to withstand deformation under load and repeated impacts better than polystyrene.

Document EP-A-0,530,486 describes the manufacture of cellular articles, whose mechanical properties—especially the impact strength, are improved, from particular blends consisting of an ethylene/propylene block copolymer containing a non-crystalline elastomeric fraction and of a random copolymer based on ethylene (0.5 to 6% by weight) and on propylene (94 to 99.5% by weight) or on 1-butene (0.5 to 12% by weight) and on propylene (88 to 99.5% by weight).

Document DE-A-4,420,590 discloses polyolefin foam particles of uniform density which are obtained from a blend compatible with at least two different propylene polymers, the said blend consisting mostly of propylene copolymers and terpolymers.

One problem that the blends described above do not solve completely satisfactorily is the achievement of the optimum compromise between the mechanical properties and the cohesion of the cellular articles manufactured from these blends.

Compositions have now been found which are able to provide expanded granules having the desired compromise of properties.

The present invention therefore relates, principally, to a composition for expanded granules which comprises, per 100 parts by weight, from 60 to 90 parts by weight of a propylene homopolymer (A) having a melt flow index (MFI), measured according to the ASTM D 1238 (1986) standard, under a load of 2.16 kg at 230° C. and expressed in g/10 min, ranging from 0.1 to 20 and from 40 to 10 parts by weight of a propylene random copolymer (B) containing from 3 to 20 mol % of ethylene and/or of an α-olefin having from 4 to 6 carbon atoms, the MFI of which ranges from 25 to 3000 g/10 min.

The polymers (A) and (B) contained in the composition according to the invention are semicrystalline in the sense of the meaning given in "Plastics Engineering", 2nd edition, R. J. Crawford, Pergamon Press (1987), pages 3 and 4.

The amount of homopolymer (A) contained in the composition is preferably at least 65 parts by weight. This amount is furthermore usually more than 85 parts by weight. Too low a homopolymer (A) content in the composition is to the detriment of the rigidity of the cellular final article. Too high a homopolymer (A) content in the composition is to the detriment of the mutual adhesion of the expanded granules obtained from the composition as well as to the quality of the expansion.

The value of the MFI of the homopolymer (A) is preferably at least 1 g/10 min, usually at least 1.5 and more particularly at least 1.8 g/10 min. Usually, it does not exceed 10 g/10 min, preferably 5 g/10 min. Values not exceeding 3.7 g/10 min are very suitable.

The homopolymer (A) used in the composition according to the invention is generally a polymer containing essentially linear chains, i.e. chains which do not have any side branches. The term "homopolymer (A)" should be understood to mean polymers derived only from propylene. It should also be understood to mean propylene copolymers containing small amounts of comonomer(s). In practice, the maximum amount of comonomer(s) contained in the homopolymer (A) should not exceed 1% by weight and preferably should not exceed 0.7% by weight. The isotacticity index (II) of the homopolymer (A), measured by $^{13}$C NMR, is at least 93. Good results are obtained with homopolymers (A) whose II is at least 95.

The homopolymer (A) generally has a flexural modulus of elasticity (FlexMod) (measured at 23° C. on an injection-moulded test piece 4 mm in thickness, according to the ASTM D 790 M standard) ranging from 1200 to 2450 MPa. Preferably, the FlexMod of the homopolymer (A) is at least 1300 MPa. Usually, this FlexMod does not exceed 2350 MPa.

The composition according to the invention also contains, per 100 parts by weight, from 40 to 10 parts by weight of a propylene random copolymer (B) containing from 3 to 20 mol % of ethylene and/or of an α-olefin having from 4 to 6 carbon atoms.

The amount of copolymer (B) contained in the composition is preferably at most 35 parts by weight. This amount is furthermore usually at least 15 parts by weight. Too low a copolymer (B) content in the composition is to the detriment of the mutual heat-sealing of the expanded granules obtained initially from the composition as well as to the quality of the expansion. Too high a copolymer (B) content in the composition is to the detriment of the rigidity of the cellular final article.

The random copolymer (B) used in the composition according to the invention is chosen from semicrystalline propylene random copolymers containing at least one comonomer chosen from ethylene and $C_4$–$C_6$ α-olefins. Among the latter, 1-butene is preferred.

The content of comonomers in the random copolymer (B) is generally from 3 to 20 mol %. Within this range, the optimum content of comonomer depends on its nature.

Although terpolymers containing simultaneously ethylene and a $C_4$–$C_6$ α-olefin are in no way excluded from the scope of the invention, semicrystalline propylene random copolymers (B) containing, respectively, only ethylene or 1-butene, are preferred.

The value of the MFI of the copolymer (B) ranges from 25 to 3000 g/10 min. This value is usually at least 80 g/10 min, preferably at least 100 g/10 min and advantageously at least 120 g/10 min. Values of at least 130 g/10 min are very suitable. This value is usually at most 1000 g/10 min, preferably at most 300 g/10 min. Good results are obtained when the copolymer (B) has an MFI of at most 250 g/10 min and more particularly at most 200 g/10 min. Too low an MFI value of the copolymer (B) is prejudicial to the mutual heat-sealing of the expanded granules during the manufacture of the cellular final article by moulding.

The copolymer (B) used in the composition according to the invention usually has a FlexMod ranging from 400 to 1000 MPa. Preferably, the FlexMod of the copolymer (B) is at least 500 MPa. In particular, this FlexMod does not exceed 850 MPa.

Preferred compositions according to the invention comprise, per 100 parts by weight, from 65 to 85 parts by weight of a propylene homopolymer (A) having an MFI ranging from 1.5 to 5 g/10 min and a flexural modulus of elasticity ranging from 1200 to 2450 MPa and from 35 to 15 parts by weight of a propylene random copolymer (B) containing from 3 to 20 mol % of ethylene and/or of an α-olefin having from 4 to 6 carbon atoms, the MFI of which ranges from 80 to 300 g/10 min and the flexural modulus of elasticity of which is from 400 to 1000 MPa.

Two types of composition of this type give particularly good results.

The first compositions contain from 65 to 85 parts by weight of a propylene homopolymer (A) whose MFI value ranges from 1.5 to 5 g/10 min and from 35 to 15 parts by weight of a random copolymer (B) containing from 10 to 20 mol % of 1-butene and whose MFI value ranges from 120 to 250 g/10 min. This butene content is most particularly at least 12 mol %. It is most particularly at most 18 mol %.

The second compositions contain from 65 to 85 parts by weight of a propylene homopolymer (A) whose MFI value ranges from 1.5 to 5 g/10 min and whose II is at least 97 and from 35 to 15 parts by weight of a random copolymer (B) containing from 3.5 to 12 mol % of ethylene and whose MFI value ranges from 100 to 200 g/10 min. This ethylene content is most particularly at least 4 mol %. It is most particularly at most 10 mol % and preferably at most 8 mol %.

In this case, the homopolymer (A) is more particularly chosen from high-rigidity polymers usually called HIPP (high isotactic polypropylene), in which polymers a conventional nucleation agent (talc, sodium benzoate, sorbitol derivatives, etc.) is often incorporated.

The comonomer contents mentioned in the present description are determined by Fourier transform IR spectroscopy on the polymer converted into a 200 μm pressed film. It is the absorption bands at 732 and 720 cm$^{-1}$ that are used to determine the ethylene content of the copolymer in the meaning of the present description. The absorption band at 767 cm$^{-1}$ is used to determine the 1-butene content.

With regard to the manufacture of the composition according to the invention, which constitutes another aspect of the latter, the homopolymer (A) and the copolymer (B) are blended together. This blending may be carried out using any known process. This blend may be achieved by synthesizing the homopolymer (A) followed, in the same medium or in a different medium into which the homopolymer (A) is introduced, by synthesizing the random copolymer (B). It is also possible to carry out mechanical blending of the two preformed polymers.

In the case of successive syntheses, the process for obtaining the composition comprises two successive polymerization steps in which from 60 to 90 parts by weight of a propylene homopolymer (A) having an MFI ranging from 0.1 to 20 g/10 min and from 40 to 10 parts by weight of a propylene random copolymer (B) containing from 3 to 20 mol % of ethylene and/or of an α-olefin having from 4 to 6 carbon atoms, the MFI of which ranges from 25 to 3000 g/10 min, are prepared, respectively. Each of the polymerization steps in the said process may be carried out, under general conditions well known to those skilled in the art, in the same polymerization medium or in different polymerization media. Generally, the homopolymer (A) is firstly prepared and then the copolymer (B) is prepared in the presence of the homopolymer (A) from the first step. These steps may be carried out, each independently of each other, in suspension in an inert hydrocarbon diluent, in the propylene maintained in the liquid state or else in the gas phase (using a stirred bed or preferably using a fluidized bed).

The homopolymer (A) and the copolymer (B) used in the composition obtained according to the invention may be prepared in the presence of any known catalytic system which is sufficiently productive and stereospecific, allowing propylene to be polymerized in sufficiently isotactic form and making it possible to incorporate the required amounts of ethylene and/or of $C_4$–$C_6$ α-olefin into the polymer.

These catalytic systems, like the general conditions for synthesizing these polymers, are well known to those skilled in the art.

With regard to the MFI of the homopolymer (A) and of the copolymer (B) which are formed, they may be adjusted by adding one or more known agents for adjusting the molecular mass. Hydrogen is most commonly used. Its relative concentration in the medium for preparing the copolymer (B) is generally markedly higher than in the medium for preparing the homopolymer (A), on account of the markedly higher MFIs to be conferred on the former.

The required amounts of monomer(s) and of agent(s) for adjusting the molecular mass may be introduced into the polymerization medium in a continuous or discontinuous manner.

With regard to the manufacture of the composition according to the invention, the homopolymer (A) and the copolymer (B) may also be mechanically blended together. According to this variant, the homopolymer (A) and the copolymer (B) are prepared separately and they are melt blended. According to this variant, use may be made of a copolymer (B) precursor, obtained under polymerization conditions resulting in an MFI of less than that of the copolymer (B) contained in the composition according to the invention. The MFI of the precursor then generally ranges from 1 to 20 g/10 min, preferably from 3 to 10 g/10 min. This MFI can be brought to the necessary value by "depolymerizing" ("visbreaking") it in a conventional manner by mixing it with an organic peroxide at a high shear rate. In general, the peroxide is mixed into the copolymer (B) precursor in the molten state, generally at a temperature of between 130 and 350° C.

The mixing time depends on the amount of copolymer (B) precursor and on the amount and nature of the peroxide employed, as well as on the type of device used for the mixing. It is generally between 1 second and 1 hour.

The amount of organic peroxide employed must be at least sufficient to cause depolymerization of the copolymer (B) precursor so as to bring its MFI to the desired value.

In order to carry out the mixing, it is possible to use any device, known for this purpose, giving it a sufficiently high shear rate. Thus, it is possible to work just as well with external mixers as with internal mixers. Internal mixers are the most appropriate and include Brabender-type batch mixers and continuous mixers such as extruders.

The composition according to the invention may contain, apart from the essential constituents mentioned above, known conventional additives such as stabilizers, pigments, colorants, fillers, fire retardants, antistatic agents, lubricants, slip-promoting agents, etc.

Preferably, the composition according to the invention contains, by way of polymers, only the polymers (A) and (B) defined above.

The composition according to the invention has a number of properties making it particularly suitable for the manufacture of expanded granules and for the subsequent manufacture, starting from the latter, of cellular articles. It also has good high-temperature mechanical properties.

The value of the MFI of the composition generally ranges from 1 to 30 g/10 min.

This value is preferably at least 3 g/10 min and most particularly at least 5 g/10 min. This value is preferably at most 25 g/10 min and most particularly at most 15 g/10 min. Too low an MFI value makes the composition difficult to process. Too high an MFI value is prejudicial to homogeneous expansion of the composition for manufacturing the granules. It is advantageous, for mutual sealing of the expanded granules and for the quality of the expansion, for the MFI of the composition to be the resultant—within the abovementioned respective ranges—of much higher MFI values for the copolymer (B) than for the homopolymer (A).

The composition according to the invention generally has a FlexMod ranging from 600 to 2000 MPa. Preferably, this FlexMod is at least 800 MPa. Usually, this FlexMod does not exceed 1900 MPa.

Particularly preferred compositions according to the invention have a FlexMod ranging from 800 to 1900 MPa and an MFI ranging from 3 to 25 g/10 min.

In order to manufacture expanded granules, it is advantageous for the composition according to the invention to be in the form of pregranules of average size ranging from 0.5 to 5 mm, preferably from 0.8 to 2 mm. These pregranules may be obtained, for example, by extruding the composition.

The compositions according to the invention combine:
(1) an ability to be homogeneously expanded so as to give the cellular final article a sufficiently high rigidity and a sufficiently low density,
(2) a broad temperature range for moulding the expanded granules and
(3) good high-temperature mechanical properties.

The conversion of the composition according to the invention into expanded granules and the subsequent moulding of these granules into cellular articles are generally carried out in the conventional manner described, for example, in documents EP-A-0,317,995 and U.S. Pat. No. 4,626,555, the contents of which are incorporated in the present description for reference.

The pregranules are dispersed in a closed vessel maintained under pressure in water in the presence of a volatile expansion agent and of a dispersing agent. The suspension obtained is heated to a temperature above the softening temperature of the composition and preferably to a temperature 5 to 20° C. below its crystalline melting temperature. The pressure inside the closed vessel is generally of the same order of magnitude as the vapour pressure of the volatile expansion agent at the temperature in question. Next, the suspension is expanded, preferably via a device for discharging a closed vessel, located below the level of the suspension. Expanded granules based on the composition according to the invention are thus obtained.

The amount of water used as dispersion medium is generally from 150 to 1000 parts by weight, preferably from 200 to 500 parts by weight per 100 parts by weight of particles of the composition according to the invention.

The volatile expansion agent is generally chosen from organic compounds whose boiling point is below 80° C. under standard conditions. Aliphatic hydrocarbons, halogenated aliphatic hydrocarbons and mixtures thereof are preferably used. Examples of very suitable volatile expansion agents are propane, butane, pentane, hexane, heptane, trichlorofluoromethane, dichlorodifluoromethane, dichlorotetrafluoroethane, methyl chloride, ethyl chloride, methylene chloride, etc.

The volatile expansion agent is generally employed in an amount ranging from 10 to 50, preferably from 15 to 30, parts by weight per 100 parts by weight of particles of the composition according to the invention.

The dispersing agent is generally chosen from:
inorganic dispersing agents, such as aluminium oxide, titanium oxide, magnesium carbonate, calcium carbonate, calcium phosphate, etc.;
water-soluble polymeric protective colloids, such as polyvinyl alcohol, carboxymethylcellulose, N-polyvinylpyrrolidone, etc.;
anionic surfactants, such as dodecylbenzene sulphonate, sodium alkylsulphates, sodium dialkylsulphosuccinates, etc.

The dispersing agent is generally employed in an amount ranging from 0.04 to 2 parts by weight per 100 parts by weight of particles of the composition according to the invention.

The expanded granules thus obtained generally have a bulk density ranging from 10 to 200 kg/m$^3$, preferably from 15 to 100 kg/m$^3$ and most particularly from 20 to 60 kg/m$^3$. They may be subjected, simultaneously or subsequently to the above treatment, to a complementary treatment for stabilizing their porosity, especially if their bulk density is relatively low. This complementary treatment generally consists in keeping the expanded granules in an atmosphere of air or of inert gas, such as nitrogen, optionally diluted with the volatile expansion agent, at a pressure of 0.5 to 10 bar for 5 to 100 hours. Finally, the expanded granules thus obtained may be moulded into the form of cellular articles, such as insulating sheets or panels, filling materials for the construction industry, impact-resistant packaging articles, components for the motor-vehicle industry, etc. This moulding is generally carried out by heating a mould, having the suitable shape and allowing the gaseous by-products to escape therefrom, with the expanded granules and by heating the mould by means of steam at a pressure of 1 to 5 bar, thus causing the expanded granules to undergo secondary expansion and causing mutual agglomeration. After cooling the mould, the desired cellular article is obtained.

The following examples illustrate the invention.

EXAMPLE 1

A blend is produced which comprises 80% by weight of a propylene homopolymer, the MFI of which is 3.5 g/10 min and the FlexMod of which is 1420 MPa, and 20% by weight of a propylene/1-butene copolymer containing 15 mol % of 1-butene and the MFI of which is 220 g/10 min and the FlexMod of which is 600 MPa [the copolymer was obtained by depolymerization of a 5 g/10 min MFI precursor melt-mixed in an extruder with 1.6 g/kg of 2,5-dimethyl-2,5-di-(tert-butylperoxy)hexane (DHBP)].

This blend, which has an MFI of 9.2 g/10 min and a FlexMod of 1250 MPa, is granulated so as to obtain particles having an average diameter of 1 mm.

These particles are introduced into a closed vessel containing water, dichlorodifluoromethane as volatile expansion agent, and a mixture of calcium phosphate and sodium dodecylbenzenesulphonate as dispersing agent. This vessel is maintained at a temperature of 125° C. and at a pressure of 20 bar for approximately 1 hour. Next, the aqueous suspension is discharged, by expansion to atmospheric pressure, via a valve located below the level reached by this suspension inside the vessel in order to obtain expanded granules whose bulk density is 30 kg/m$^3$.

After these granules have been dried, they are compressed in a mould which is provided with steam removal holes and is heated by pressurized steam at approximately 150° C. for 4 minutes. The cellular article obtained is cooled and demoulded at ambient temperature.

EXAMPLE 2

A blend is produced which comprises 70% by weight of a highly crystalline propylene homopolymer, the MFI of which is 2.6 g/10 min, the II of which is 98 and the FlexMod of which is 2300 MPa, and 30% by weight of a propylene/ethylene copolymer containing 6.2 mol % of ethylene, the MFI of which is 150 g/10 min and the FlexMod of which is 700 MPa (the copolymer was obtained by depolymerization of a 4.6 g/10 min MFI precursor melt-mixed in an extruder with 1.5 g/kg of DHBP).

This blend, which has an MFI of 9.6 g/10 min and a FlexMod of 1800 MPa, is granulated so as to obtain particles having an average diameter of 1 mm.

These particles are converted into expanded granules and then into a cellular article as described in Example 1.

We claim:

1. Composition for expanded granules, which comprises, per 100 parts by weight, from 60 to 90 parts by weight of a propylene homopolymer (A) having a melt flow index (MFI), measured according to the ASTM D 1238 (1986) standard, under a load of 2.16 kg at 230° C. and expressed in g/10 min, ranging from 0.1 to 20 and from 40 to 10 parts by weight of a propylene random copolymer (B) containing from 3 to 20 mol % of ethylene and/or of an α-olefin having from 4 to 6 carbon atoms, the MFI of which ranges from 25 to 3000 g/10 min.

2. Composition according to claim 1, having a flexural modulus of elasticity (FlexMod) ranging from 600 to 2000 MPa and an MFI ranging from 1 to 30 g/10 min.

3. Composition according to claim 1, comprising, per 100 parts by weight, from 65 to 85 parts by weight of a propylene homopolymer (A) having an MFI ranging from 1.5 to 5 g/10 min and a flexural modulus of elasticity ranging from 1200 to 2450 MPa and from 35 to 15 parts by weight of a propylene random copolymer (B) containing from 3 to 20 mol % of ethylene and/or of an α-olefin having from 4 to 6 carbon atoms, the MFI of which ranges from 80 to 300 g/10 min and the flexural modulus of elasticity ranges from 400 to 1000 MPa.

4. Composition according to claim 1, having a flexural modulus of elasticity ranging from 800 to 1900 MPa and an MFI ranging from 3 to 25 g/10 min.

5. Composition according to claim 3, in which the propylene homopolymer has an isotacticity measured by $^{13}C$ NMR of at least 97 and the random copolymer (B) contains from 3.5 to 12 mol % of ethylene and has an MFI ranging from 100 to 200 g/10 min.

6. Composition according to claim 3, in which the random copolymer (B) contains from 10 to 20 mol % of 1-butene and has an MFI ranging from 120 to 250 g/10 min.

7. Process for obtaining a composition for expanded granules according to claim 1, which comprises two successive polymerization steps in which from 60 to 90 parts by weight of a propylene homopolymer (A) having an MFI ranging from 0.1 to 20 g/10 min and from 40 to 10 parts by weight of a propylene random copolymer (B) containing from 3 to 20 mol % of ethylene and/or of an α-olefin having from 4 to 6 carbon atoms, the MFI of which ranges from 25 to 3000 g/10 min, are prepared, respectively.

8. Process for obtaining a composition for expanded granules according to claim 1, by melt-mixing from 60 to 90 parts by weight of a propylene homopolymer (A) having an MFI ranging from 0.1 to 20 g/10 min and from 40 to 10 parts by weight of a propylene random copolymer (B) containing from 3 to 20 mol % of ethylene and/or of an α-olefin having from 4 to 6 carbon atoms, the MFI of which ranges from 25 to 3000 g/10 min.

9. Cellular articles fashioned by moulding expanded granules obtained from a composition according to claim 1.

10. A method of forming expanded granules which comprises admixing the composition of claim 1 with a volatile expansion agent.

11. The method of claim 10, wherein the expanded granules exhibit a bulk density of which ranges from 10 to 200 kg/m$^3$.

12. Expanded granules comprising the composition of claim 1.

13. The expanded granules of claim 12 wherein the propylene random copolymer is formed from ethylene as a comonomer.

14. The expanded granules of claim 12, wherein the propylene random copolymer is formed from a butene comonomer.

* * * * *